June 24, 1930.  P. J. McCULLOUGH  1,767,086
VALVE
Filed Oct. 31, 1927
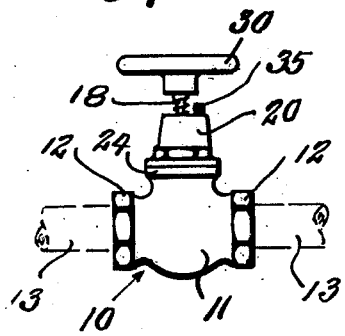
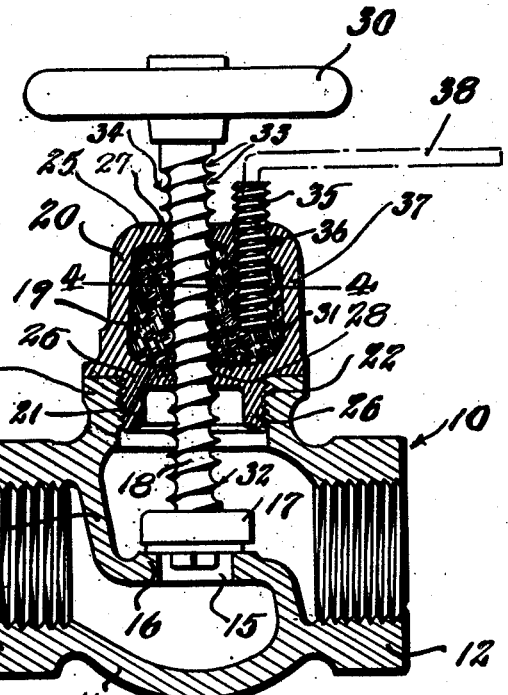
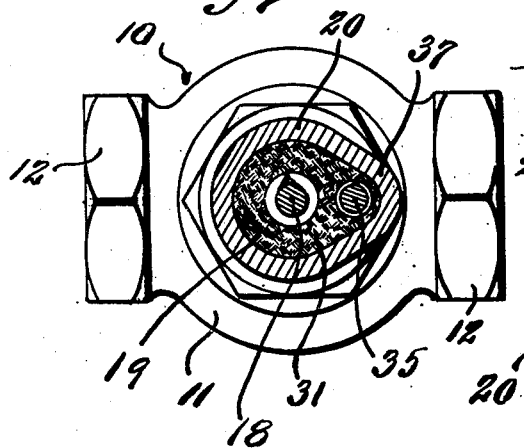
Inventor
Paul J. McCullough
By Cornwall, Bidell & Janne
Attys.

Patented June 24, 1930

1,767,086

UNITED STATES PATENT OFFICE

PAUL J. McCULLOUGH, OF ST. LOUIS, MISSOURI

VALVE

Application filed October 31, 1927. Serial No. 229,907.

My invention relates to valves, and has for its object the provision of a valve which is securely packed to prevent leakage along the valve stem.

Other objects of the invention are to provide a valve having an improved valve stem which is so constructed as to form a threaded sealing engagement with the packing disposed in the stuffing chamber of the valve and which stem also has threaded engagement with the metallic portions of said valve.

Further objects of the invention are to provide a valve stem having an improved thread whereby said stem is engageable with the packing disposed in the stuffing chamber of the bonnet by virtue of the fact that said packing is closely packed under pressure around the thread of said stem thereby providing an efficient threaded engagement between the stem and the packing material which is held stationary in the bonnet thereby considerably increasing the sealing surface contact between the stem and said packing material.

Still other objects of the invention are to provide an improved valve of the class described and to provide means for maintaining said packing under compression so as to insure, at all times, efficient engagement between said packing and the thread of said valve stem.

Additional objects of the invention are to generally improve upon and simplify the construction of globe valves, reduce the number of parts and machine operations entering into the construction of the valves, and insuring efficient operation of the valve with minimum danger of leakage.

With these and other objects in view, my invention consists in certain novel features of construction and arrangement of parts hereinafter more fully described, and claimed, and illustrated, in which—

Figure 1 is a side elevational view of a valve of my improved construction.

Figure 2 is a top plan view thereof with the hand wheel removed.

Figure 3 is a vertical cross section taken longitudinally through the valve.

Figure 4 is a horizontal cross section taken on lines 4—4 of Figure 3.

Figure 5 is an enlarged detail cross section of a portion of the bonnet and the valve stem and showing the packing screw.

Heretofore, the stems of the valves were provided with either square or V-shaped threads for screw seating in the corresponding threaded bores of the bonnet or parts associated therewith. The stem was packed or sealed by suitable packing which was pressed against the smooth peripheral face of the stem but never in contact with the threaded portion of the stem by a suitable packing gland and a nut screw seated in the bonnet. Such construction requires a number of parts and a series of expensive machine operations and is not satisfactory, as it is difficult to maintain the stem sealed for a sufficient length of time.

The present invention contemplates the use of a valve stem provided with a specially designed thread for operatively engaging the packing which is disposed in a chamber traversed by said stem and is forced under pressure in close contact with the thread of said stem. The particular construction of this thread provides a large surface contact with the packing thereby providing an efficient seal for the stem and furthermore, said stem is movable longitudinally by virtue of the engagement of said thread with the packing and with the threaded bores in the upper and lower walls of the stuffing chamber. That portion of the packing which is in contact with the threaded portion of the valve stem, never changes in area regardless of the wear of the packing or the adjustments.

Referring by numerals to the accompanying drawings, 10 indicates a globe valve comprising a body or shell portion 11 provided with flanged ends 12 which are tapped for the reception of threaded ends of pipes 13. The interior of the shell portion is divided by a diaphragm or partition wall 14 into two chambers which are in communication by means of an opening 15 formed in the horizontally disposed valve seat 16 of diaphragm 14. This opening 15 is controlled by a valve disk 17 mounted on the lower end of a vertically disposed valve stem 18.

Stem 18 extends upwardly and passes through a stuffing chamber cored in the bonnet 20. An exteriorly threaded extension 21 is formed on the lower end of bonnet 20 and engages the threaded bore 22 formed in bonnet flange 24. Stuffing chamber 19, which is comparatively large and arranged coaxially with stem 18, is closed at both ends by end walls formed integral with the bonnet 20. The upper end of stuffing chamber 19 being closed by the top wall 25, while the lower end is closed by a bottom wall 26. Top wall 25 and bottom wall 26 are provided with vertically disposed aligned openings 27 and 28, respectively, which are threaded to receive valve stem 18 which projects therethrough. The upper projecting end of stem 18 has fixed thereto a hand wheel 30 by means of which said stem can be actuated to seat and unseat valve disk 17.

The stuffing box 19 is completely filled with suitable packing material 31 and valve stem 18 is caused to extend through this material and have a threaded engagement therewith. In order to provide efficient operating and sealing engagement between said packing and said stem, the latter is formed with a specially designed screw thread 32 having a comparatively wide root 33 which is concave in cross section, while the walls of the thread taper and terminate in comparatively thin crowns 34. Thus, the packing 31 has a large surface contact with the stem and the thread of this stem is formed so as to facilitate the movement of the stem without disturbing the internal thread molded in said packing 31 by stem thread 32. The stem is threaded substantially throughout its entire length and has threaded engagement with the packing as well as with the metal portions of the valve.

The packing 31 has to be placed under compression so as to completely surround the stem 18 and mold the packing 31 to conform to the thread of the stem. To this end, I provide a packing screw 35, which is screw seated in a threaded bore 36 formed in the bonnet 20 and preferably to one side of and parallel with stem 18, there being an extension 37 formed on said bonnet for the accommodation of this screw. The lower end of this screw projects into chamber 19 and bears against the packing material disposed therein. By screwing said screw downwardly the packing disposed in said chamber is displaced and placed under compression causing it to pack closely around the stem 18. The outer socketed end of the screw may be reached by a suitable tool through the open spaces formed between the spokes of the hand wheel or a right angled member 38 may be used as indicated in dotted lines in Figure 3.

The packing which may be of any suitable material, being preferably in loose form, is introduced into the stuffing chamber 19 through bore 36, from which the screw 35 has been removed. After the chamber has been completely filled screw 35 is screw seated in said bore and compresses the packing so that it completely fills the chamber and surrounds the threaded valve stem.

While I have shown and described the preferred form of my invention, it is obvious that various changes could be made in the construction of my improved valve, without departing from the spirit of my invention.

I claim:

1. A valve construction comprising in combination a body portion, a valve arranged therein for controlling the passage of fluid therethrough, an extension on said body portion provided with an elongated stuffing chamber, a threaded valve stem for actuating said valve, said stem extending through said stuffing chamber, there being aligned openings formed in the end walls of said stuffing chamber for receiving said stem, packing material completely filling said stuffing chamber and closely packed around said stem, whereby the major portions of the latter has a threaded operative engagement, the thread of said stem being comparatively wide and deep with the crown portion formed thin and the root portion formed wide and curved, and means in said extension for placing said packing under pressure.

2. A valve construction comprising in combination a body portion, a valve for controlling the communication therethrough, a bonnet detachably secured to said body portion and provided with an elongated stuffing chamber having its end walls formed with aligned openings, packing material completely filling said stuffing chamber, a threaded stem screw seated in said packing material and extending through said aligned openings, the thread of said stem having a comparatively wide root and a tapered thin crown, one end of said stem being secured to said valve and the opposite end extending outwardly from said bonnet whereby said valve can be operated by the manipulation of said projecting stem end, and a screw screw-seated in said bonnet and extending into said stuffing chamber in parallel spaced relation with said stem for placing said packing material under compression to form an operative and sealing engagement with the thread of said stem.

3. A valve construction comprising in combination a body portion, a valve disposed therein for controlling the communication therethrough, an extension on said body portion and provided with an elongated chamber having apertured end walls, packing material wholly filling said chamber, and a threaded valve stem extending into said body portion through said chamber for operatively receiving said valve, said stem being freely disposed in said body portion and being screw seated in said apertured end walls and in said packing thereby providing an operative engagement and a fluid tight seal between said stem and said packing.

4. A valve construction comprising in combination a body portion, a valve disposed therein for controlling the communication therethrough, an extension on said body portion and provided with an elongated chamber having apertured end walls, packing material wholly fitting said chamber, a threaded valve stem extending freely into said body portion through said chamber for operatively receiving said valve, said stem being screw seated in said apertured end walls and in said packing thereby providing an operative engagement between said packing and said stem and forming a fluid tight seal therebetween, and means screw-seated in said extension for applying pressure to the packing contained in said chamber.

5. In a valve construction, a bonnet attachable to the valve body, said bonnet being provided with an elongated chamber having apertured end walls, packing material completely filling said chamber, and a valve steam having operative threaded engagement with said packing material throughout the entire length of said chamber and with said apertured end walls to form a fluid tight operating engagement therewith.

6. In a valve construction, the combination of a bonnet attachable to the valve body, said bonnet being provided with an elongated chamber having integral apertured end walls, packing material completely filling said chamber, a valve stem threaded throughout its entire length and having operative threaded engagement with said packing throughout its major portion and with said apertured end walls to form a fluid tight operating engagement therewith, and means screw seated in said bonnet and extending into said chamber for compressing said packing about the threaded portion of said stem.

7. In a valve construction, a bonnet attachable to a valve body, said bonnet being provided with an elongated chamber having apertured end walls, packing material completely filling said chamber, and a valve stem threaded throughout its entire length for threaded engagement with said apertured end walls and with said packing material, the thread of said stem having a comparatively wide concave root and a tapered comparatively thin crown so as to enable said packing material to be tightly packed against said thread and form a fluid tight operative seal therewith.

8. In a valve construction, the combination with a member having an elongated chamber provided with apertured end walls, of a packing material wholly filling said chamber, and a valve stem extended through said apertured end walls and traversing said chamber, said valve stem being provided with a screw thread engageable throughout the major length of said stem with said packing material, the thread of said stem being comparatively wide and deep and having a curved root and a thin tapered crown, to form operative and sealing contact with said packing material.

9. In a valve construction, a valve stem provided with an external screw thread having a comparatively wide and deep concave root and a thin sharp crown to facilitate operative and sealing engagement with a suitable packing material through which said stem extends and a valve disk carried by said stem in spaced relation with the screw-thread thereof.

10. In a valve construction, a valve stem provided with an external screw thread which in cross section has a comparatively wide and deep concave root and a tapered thin crown, said thread being adapted to be operatively engaged by the packing material which said stem traverses, thereby forming a fluid tight seal operative connection between said stem and said packing, the lower end of said valve stem being provided with a valve for cooperating with a valve seat.

11. In a valve construction, a valve stem provided throughout its entire length with a screw thread, which is comparatively deep and has a wide root and a comparatively thin tapered crown, said thread being operatively engageable with the threaded bore of the valve body and with the packing material traversed by said stem, thereby forming a fluid tight seal with said packing.

In testimony whereof I hereunto affix my signature this 21st day of October, 1927.

PAUL J. McCULLOUGH.